United States Patent [19]
Horvath

[11] Patent Number: 5,494,546
[45] Date of Patent: Feb. 27, 1996

[54] APPARATUS AND METHOD FOR APPLYING ANTI-LACERATIVE FILM TO GLASS

[76] Inventor: Steven J. Horvath, 3205 Credit Woodlands, Mississauga, Ontario, Canada, L5C 2V3

[21] Appl. No.: 198,590

[22] Filed: Feb. 18, 1994

[51] Int. Cl.[6] .............................. B32B 17/00; B29C 53/04
[52] U.S. Cl. .................. 156/102; 156/103; 156/104; 156/105; 156/212; 156/229; 156/477.1; 156/581; 156/583.3; 100/93 P; 100/295
[58] Field of Search ................... 156/87, 163, 196, 156/212, 229, 104, 102, 103, 295, 581, 443, 475, 481, 477.1, 583.3, 323, 105; 100/93 P, 295

[56] References Cited

U.S. PATENT DOCUMENTS

| | | | |
|---|---|---|---|
| 2,419,758 | 4/1947 | Borkland | 156/229 X |
| 2,897,546 | 8/1959 | Clapp et al. | 284/DIG. 73 |
| 3,476,540 | 11/1969 | Ritter, Jr. et al. | 156/102 X |
| 4,152,188 | 5/1979 | Friedrich et al. | 156/212 |
| 4,349,375 | 9/1982 | Kellar et al. | 65/291 |
| 4,564,408 | 1/1986 | Crumbach et al. | 156/212 |
| 4,707,208 | 11/1987 | Crumbach et al. | 156/285 |
| 4,772,006 | 9/1988 | Guglielmetti et al. | 271/11 |
| 4,854,997 | 8/1989 | Shimada | 156/245 |
| 4,865,670 | 9/1989 | Marks | 156/99 |
| 5,188,692 | 2/1993 | Horvath | 156/212 |

Primary Examiner—Michael W. Ball
Assistant Examiner—Francis J. Lorin
Attorney, Agent, or Firm—Donald E. Hewson

[57] ABSTRACT

An apparatus for laminating a layer of polymer plastic film to a precast layer of glass is disclosed. The apparatus comprises a support saddle having a receiving surface that is shaped and dimensioned to support the precast layer of glass. The layer of polymer plastic film is positioned by a holding means in the form of toothed upper and lower opposed collar members in spaced apart relation with respect to the glass. A ram having a hard flexible contact member adapted to intimately contact plastic film is positioned at a distance away from the plastic film. The ram and the saddle are brought towards each other so as to cause the hard flexible contact member to contact the plastic film, which in turn causes the plastic film to contact the preformed layer of glass, such that the hard flexible contact member, the plastic film, the glass and the saddle are in intimate contact seriatim. The hard flexible contact member is caused to press with greater pressure against the plastic film so as to cause the plastic film to contact a progressively radially increasing surface area of the precast layer of glass, thereby laminating the plastic film to the glass. The ram further has an elastically compressible facing member in intimate contact with the opposite surface of the hard flexible contact member, with the facing member having a selectively expandable chamber therein, in the form of a horizontally disposed slit. A selectively actuatable pressurization means permits the pressurization of the chamber so as to cause the contacting surface of the contact member to match the contour of the first surface of the precast layer of glass, thus causing an even pressure over the plastic film.

20 Claims, 7 Drawing Sheets

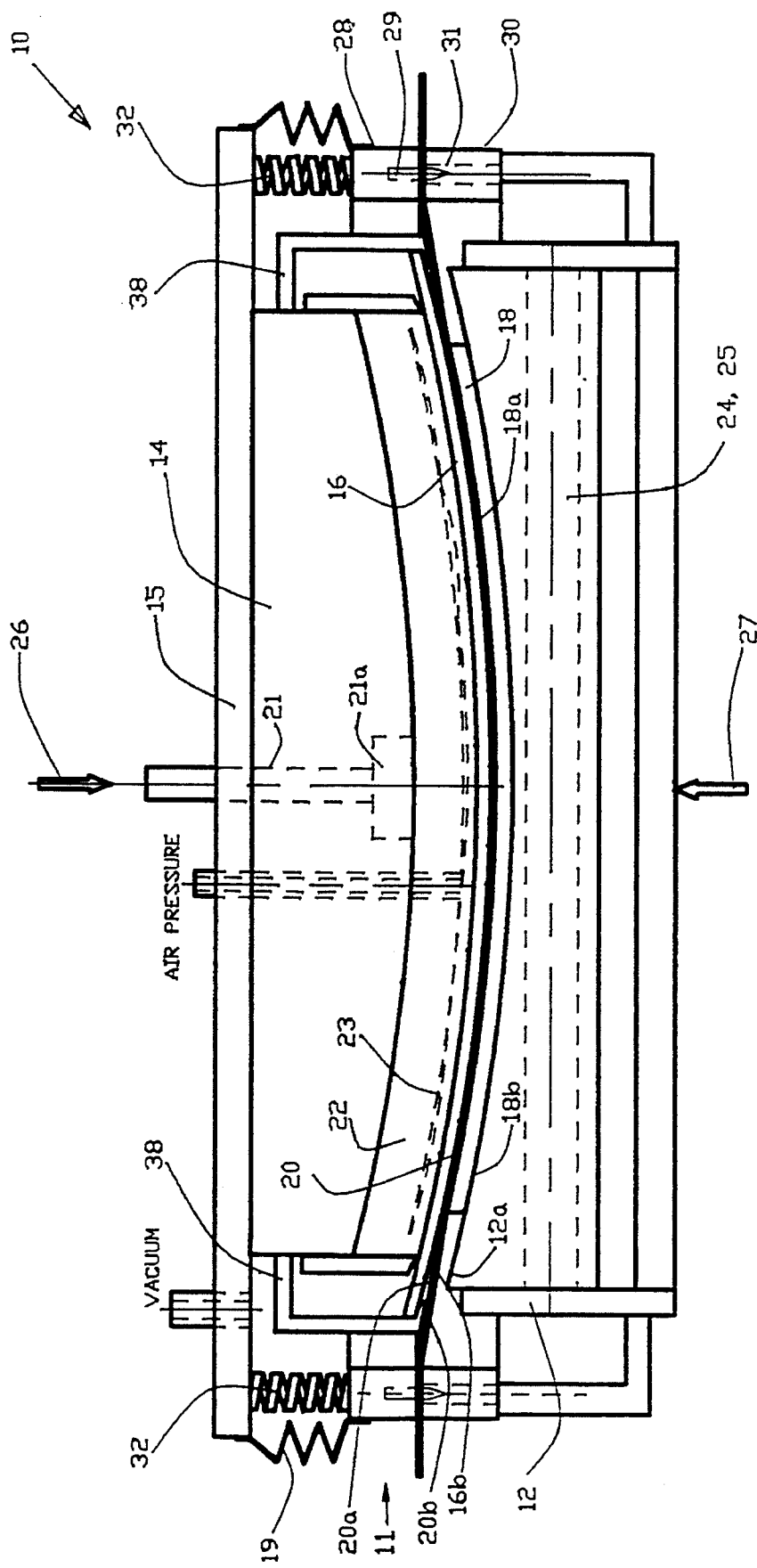

APPARATUS AND METHOD FOR APPLYING ANTI-LACERATIVE FILM TO GLASS

FIELD OF THE INVENTION

This invention relates to laminated glass/plastic film structures, and is particularly directed to apparatus and methods for producing such laminated glass/plastic film structures that are physically quite large; specifically and particularly, such glass/plastic film structures as are used for automobile windshields and side windows of automobiles and other vehicles, and indeed of other glass containing structures. The invention also provides that the multi-laminar glass/plastic film structures may be produced on apparatus and by the methods of the present invention more accurately and with less error than has previously been possible.

BACKGROUND OF THE INVENTION

The present inventor is the applicant in several previous United States patent applications, in particular U.S. application Ser. No. 07/608,850 filed Nov. 5, 1990 and issued as U.S. Pat. No. 5,188,692; and its Divisional application Ser. No. 07/779,263, filed Oct. 18, 1991 and issued as U.S. Pat. No. 5,250,146.

The previous patent applications teach an apparatus and method for laminating a layer of non-oriented polymer plastic to a precast layer of glass for much the same purposes as described above, and the present invention is particularly directed to improvements beyond the apparatus and methods as previously taught.

The automotive glass industry is, so far, highly labour intensive. For example, the preparation of a windshield or side window for an automobile very often requires a hand lay-up of the non-oriented plastic film to the glass. After the plastic film has been placed on the glass and perhaps most of the air bubbles caught between the film and the glass removed by use of a squeegee, a vacuum ring or other device may be placed around the periphery to pull as much air as possible from between the film and the glass. Thereafter, the glass/plastic film combination may be placed into an autoclave which is then pressurized and heated so as to adhere the non-oriented plastic film to the glass under the pressure and heat conditions.

Most often, in such a structure the plastic film may be a composite laminar structure of non-oriented polyvinyl butyryl together with oriented polyethylene teraphthalate (PVB/PET), or it may be a composite laminar film of non-oriented polyurethane together with polyethylene teraphthalate; or it may be PVB or polyurethane. The polyvinyl butyryl (or polyurethane) is a generally soft non-oriented material which is quite often slightly embossed and somewhat opaque because of its surface character. However, the apparent opacity of the PVB disappears when the film surface is smooth, or is made smooth under the action of heat and/or pressure. The polyethylene teraphthalate is an oriented tough film which provides anti-lacerative characteristics to the glass/plastic film structure, because glass will shatter upon impact. The PVB layer adheres the PET layer to the glass, and also provides energy absorption in the event of impact with the composite laminar structure. Thus, the PET layer provides a barrier to protect a person from shattered glass shards in the event of an accident.

It is a characteristic of polymer plastic films as discussed herein that if there are any significantly large air bubbles entrapped in the interface between that film and glass, the bubbles may remain after heat and pressure treatment, particularly as in the prior art. However, if very small air bubbles are entrapped, and particularly if the film layer is PVB, they will be absorbed by the PVB. The difficulty is that significant air bubbles at the interface between the PVB and glass, or at the PVB/PET interface, or wrinkles that may occur in the PVB or PET, will materially affect the optics of the glass/plastic film laminar structure in that an object viewed through the glass/plastic film laminate structure may appear to be distorted. This may be especially important in the event of use of glass/plastic film laminar structures as side windows of automobiles or other vehicles, since such windows are generally unframed, and the incidence of air bubbles or wrinkles especially near the edges of the glass is not acceptable.

As it happens, in a simple laminated structure having glass together with PVB/PET, the composite layer of non-oriented PVB polymer plastic film together with oriented PET polymer plastic film is applied to the inside surface of the glass—that is, to the concave side of the curve if the precast glass is curved, which will be the inside surface of the windshield or side window when in use.

The autoclave procedure to adhere a non-oriented plastic film to glass required several hours per cycle, and it is not possible until the after the cycle has finished to determine if the glass/plastic film laminate workpiece being produced is acceptable. In other words, there is no determination of scrap (other than breakage) until after the autoclave cycle has been concluded. Moreover, the amount of unusable workpieces which become scrap may be high, so that the prior art autoclave production methods may be significantly inefficient as to the use of labour, the use of time, and particularly as to the use of energy.

In the meantime, the use of glass to which a polymer plastic film has been adhered as a windshield or as a side window of automobiles and the like has been approved, and it is expected that such use may become mandatory. In particular, use of such laminated glass/plastic film structures as side windows is a significant safety step as there is little that can be done to preclude impact of an object against the side window in the event of an accident where there may be relative sideways movement of any object to the side window; whereas the increasing use of seat belts—the use of which is mandatory in most jurisdictions—and the increasing use of air bags may reduce the chance of impact, particularly of the head of a driver or passenger against the windshield of an automobile.

The production of PVB/PET having uniform thickness is highly desirable, but is difficult if not nearly impossible to achieve using any known prior art laminating apparatus method. Non-uniform thickness of PVB/PET may result in distortion which is visible. Lack of uniform thickness may be present in some or all of three ways, as described below.

One way is characterized by the thickness of the plastic film layer changing over the surface of the precast layer of glass so as to conform to minor irregularities in the surface of the glass. In contrast, the opposite side of the plastic film conforms to the different irregular shape as caused by the surface of the contact surface of the ram. Resultingly, the thickness of the plastic film after it has been applied to the glass tends to vary enough across the surface of the windshield so as to cause unacceptable visual distortion. This above described problem can be overcome through the use of a ram having a contact portion that is specifically contoured to conform to the shape of the upper surface of the precast layer of glass.

A second way is characterized by the thickness of the plastic film increasing or decreasing, as the case may be, from one edge of the precast layer of glass toward an opposite edge. This overall change in thickness is caused by the lower surface of the ram being oriented at a slight angle to the upper surface of the glass. The plastic film is in essence squeezed to conform to this slightly angled shaped. This above described problem can be overcome through the use of a ram that adapts to any angular discrepancy between the ram and the precast layer of glass.

A third way is characterized by the thickness of the plastic film over the surface of the precast layer of glass as the plastic film is stretched over the precast layer of glass during its application. The stretching of the plastic film causes a corresponding decrease in the thickness of the film. For the film to be of a constant thickness, the decrease as caused by the stretching must also be constant. Accordingly, the plastic film must be stretched evenly during its application. This can be accomplished by clamping the plastic film at a pre-calculated shape and size near its perimeter in such a manner so as to preclude slippage of the plastic film. Clamping of the film so as to preclude slippage is very difficult, especially with PET. This above described problem can be overcome through the use of a toothed-clamping means that punctures the plastic film. Further, the pre-calculated shape and size of the clamping means must permit even stretching of the pre-cast layer of polymer plastic film retained therewithin.

The present inventor has noted that the relatively soft PVB (or polyurethane) non-oriented plastic film layer may indeed act as a gauge when a ram or pusher is being used to press the film against the glass. What this does is to permit a slight adjustment of the glass and the pusher ram acting against it, and this phenomenon occurs as a function of the temperature and/or pressure working on the PVB. In any event, because cold or warm PVB has a moderate tensile strength, it is possible to push a ram against the film and to contact it against the glass—the details of which are discussed hereafter—so that when the film and glass are fully contacted in a manner that substantially precludes any large air bubbles to have occurred, the structure may be heated to the laminating temperature of the PVB.

PRIOR ART

U.S. Pat. No. 4,564,408 to CRUMBACH et al, issued Jan. 14, 1986, discloses a process and device for covering a lens preform with a protective sheet. In this device, a pressing element 6 of a preform shaped and made from a rubber material, has an outer surface that is slightly more curved than the concave surface of a glass preform 3. The pressing element 6 causes a sheet of plastic material to contact the glass preform 3 in the middle thereof. The application of continued pressure of the pressing element 6 on the layer of plastic and glass preform 3 causes the pressing element 6 to deform slightly and contact a continually larger surface area of the plastic and glass preform 3, so as to apply the plastic to the glass preform 3. This prior art process and device does not solve the problems as previously discussed herein, associated with the prior art in general.

Of particular interest in the prior art is U.S. Pat. No. 4,707,208 to CRUMBACH et al, issued Nov. 17, 1987, which discloses a method for covering a lens blank with a protective plastic film. This method involves the use of air pressure to shoot a layer of plastic film 3 onto the concave surface of a lens 1. The plastic film 3 first contacts the concave surface of the lens 1 in the middle thereof. Continuing pressure from ports 16 in the holding plate 5 below causes the contact area to increase toward the edge of the lens 1. This method does to a large degree solve the above discussed two problems of non-uniform thickness of the plastic layer on the glass, however, this method is not useable in applying a layer of suitable plastic film to a precast layer of glass or an automobile windshield due to pressure and temperature considerations. Further, a precast layer of glass having compound curves might not be able to have a layer of film applied in this manner.

U.S. Pat. No. 5,188,692 to HORVATH, issued Feb. 23, 1993, discloses a method for applying anti-lacerative film to glass. In that prior art patent, it is disclosed to use a ram 14 having a silicon rubber lower layer 16 or alternatively having a lower layer that is made from a hard yet flexible material such as glass. In either case, the lower layer somewhat conforms to the shape of the upper surface of the glass that the layer of plastic film 20 is being applied to. While acceptable results in terms of applying a plastic film to a precast layer of glass without trapping air bubbles therebetween have been realized using the method and apparatus disclosed in that prior patent, it has been found that the thickness of the plastic film after it has been applied to the precast layer of glass can vary by an unacceptable amount.

SUMMARY OF THE INVENTION

The present invention may apply to precast glass which is essentially flat, but it is especially adapted for precast glass that is curved such as for use as windshields and side windows of automobiles. Sometimes the contour of such precast glass may be quite complex. Thus, the apparatus and methods of the present invention apply to the production of laminated glass and polymer plastic film whether the precast glass is flat, has a simple curvature, or a compound curvature.

One of the essential characteristics of the apparatus of the present invention is that at least one of the saddle—or at least the face of the saddle that is next to the glass when the glass is placed in the saddle—the ram, or both, should have good heat transfer characteristics. Thus, when it is desired in practising the present invention for the glass to be heated up, heat is transferred to the glass through the saddle quite quickly, and likewise, when it is desired for the glass to be cooled down, heat is extracted from the glass through the saddle quite quickly.

As described hereafter, although it is usual for the heat to be transferred to the glass through the saddle, it is possible to heat and cool the ram, or to heat one of the saddle and the ram and to cool the other. The present invention also contemplates that one of the saddle and the ram—usually the saddle—may be constantly heated, and the other—usually the ram—may be cooled sufficiently as to cause gross heat extraction away from the glass and polymer plastic combination.

The surface of the upper side of the saddle must generally conform to the surface of the outer curvature of the glass so as to fully support the glass. In order to achieve such conformity, it is desirable for the surface of the saddle to be machined as closely as possible to the outside curvature or contour of the glass to be placed on it. However, because glass is reasonably flexible, at least ordinary manufacturing tolerances in terms of preparation of the surface of the saddle may be accommodated.

In any event, if the surface of the saddle has essentially the same coefficient of heat expansion and contraction as that of glass, then as the glass is heated up and cooled down there is essentially zero slippage of the glass with respect to the face of the saddle. Obviously, as the glass is being heated up and cooled down while the ram is exerting pressure against the upper side of the glass, if the glass has a coefficient of heat expansion and contraction which is significantly different than that of the saddle, then either the saddle or the glass will expand or contract at a different rate than the other. Since glass has very little or substantially zero tensile strength, although it has quite high compression strength, if the saddle is permitted to expand faster than the glass then there is a possibility that the glass will break as it is being heated because the saddle will have expanded faster. Likewise, if the saddle expands (and contracts) slower than the glass, then there is a likelihood that the glass will break during cool-down. Such breakage may occur because of the friction or stiction between the glass and the surface of the saddle.

It is possible for the surface of the saddle to be coated with a material that permits some slippage, such as silicone or PTFE.

The present invention contemplates that stainless steel—for example stainless steel (compound SS430)—is particularly useful because it has a coefficient of heat expansion which is quite similar to that of glass. Alternatively, an aluminum base plate (or a base plate of other metal having high heat transfer characteristics, such as brass or copper) may be used because of the higher heat conductivity than that of steel, so that the base plate may be heated and cooled using appropriate heaters and cooling fluids and the like, with a stainless steel face being presented against the glass by the top of the saddle.

As discussed hereafter, the present invention also contemplates multi-laminar compound structures having two layer of glass with at least one layer of non-oriented polymer plastic film, one layer of oriented polymer plastic film, and perhaps even two layers of non-oriented polymer plastic film. Even in the event of the manufacture of windshields, because of the specific structures of the ram and saddle as discussed in detail hereafter, the apparatus and methods of the invention are more tolerant of mismatched pairs of glass in such multi-laminar structures as contemplated immediately above.

As noted above, the present invention contemplates the production of complex single or multi-layer glass structures having oriented and/or non-oriented polymer plastic films. For example, a windshield for an automobile may comprise laminates of glass, a non-oriented polymer plastic film, and glass; and the non-oriented polymer plastic film may be one of polyvinyl butyryl and polyurethane. Methods and apparatus for producing such a windshield are provided by the present invention.

Likewise, a safety windshield or side window for an automobile may be produced in keeping with present invention, where the safety windshield or side window comprises laminated of glass, a first non-oriented polymer plastic film, glass, and a second non-oriented polymer plastic film layer may also be polyurethane; and in any event is placed on the inside surface of the safety windshield or side window when in use. The PET may also be laminated on that second layer, the PET being remote from the glass.

Thus, the present invention contemplates a complex bi-layer or multi-layer structure comprising: glass together with polyurethane; or glass together with polyurethane and PET; or glass together with PVB and PET; or glass together with polyurethane and a further layer of glass; or glass together with PVB and a further layer of glass; or glass together with PVB, a further layer of glass, and a further PVB/PET layer or a further polyurethane/PET layer; or glass together with polyurethane, a further layer of glass, and a further PVB/PET layer or a further polyurethane/PET layer.

The present invention further contemplates that the apparatus and methods taught herein can be placed and operated in any orientation. However, for ease of understanding, but not so as to limit the scope of the invention, the following discussions assume the apparatus to be placed so that the principal components are oriented horizontally and displaced or moved vertically.

In general, in the following discussions, and in the accompanying claims, the words "horizontal" and "horizontally", and the words "first direction" or "first orientation" may be read as being synonymous with one another, and the words "vertical" and "vertically", and the words "second direction" or "second orientation" may also be read as being synonymous with one another. The first and second directions or orientations are assumed to be generally mutually perpendicular—"horizontal" or "horizontally". It is submitted that this definition of directions and orientations is not a limitation of the present invention, as the present invention could function in orientations other than the specific orientation referred to herein. Therefore, it is to be understood that there may be complete freedom as to the disposition and direction of operation of any of the components or the methods of the present invention, and that the following discussion is exemplary and not intended as being restrictive in scope.

The present invention provides an apparatus for laminating a layer of polymer plastic film having opposed first (upper) and second (lower) surfaces to a first (upper) surface of a precast layer of glass having opposed first (upper) and second (lower) surfaces. The apparatus comprises a support saddle having a receiving (upper) surface that is shaped and dimensioned to support the second (lower) surface of the glass, and holding means for positioning the layer of polymer plastic film in a first (generally horizontal) orientation in spaced apart relations with respect to the precast layer of glass when the glass is supported by the receiving (upper) surface of the saddle such that the second (lower) surface of the layer of polymer plastic film faces the first (upper) surface of the precast layer of glass. A ram includes a hard flexible contact member having a contacting surface adapted to intimately contact the first (upper) surface of the layer of polymer plastic film, and an elastically compressible facing member in intimate contact with the opposite surface of the hard flexible contact member. The elastically compressible facing member has a selectively expandable chamber therein. The ram and the saddle are moveable with respect to each other between a first relative position whereat the ram is positioned in spaced apart relation with respect to the first surface of the layer of polymer plastic film and a second relative position whereat the polymer plastic film is being fully pressed against the first surface of the precast layer of glass. There is also heating means configured to provide heat to the precast layer of glass and the polymer plastic film being laminated thereto when the glass is placed on the saddle. There is also means for effecting relative movement of the ram and the saddle between the first and second relative positions, in a direction that is generally perpendicular to the first (generally vertical) orientation so as to close the distance between the ram and the polymer plastic film in the direction of the second orientation sufficiently as to cause the contact (lower) surface of the hard flexible contact member, the polymer plastic film, the glass, and the receiving face of the saddle to be in intimate physical contact seriatim, whereby the polymer plastic film contacts a progressively radially increasing surface area of the first surface of the glass and is thereby laminated to the precast layer of glass.

There is a selectively actuatable pressurization means in fluid communication with the selectively expandable chamber so as to permit the pressurization of the selectively expandable chamber. The contact surface of the hard flexible contact member is caused to match the contour of the first surface of the precast layer of glass by way of pressurization of the selectively expandable chamber.

At least the receiving (upper) face of the saddle is of a material which has a substantially identical coefficient of heat expansion and contraction to that of the glass. By use of the apparatus as described above, there is substantially zero slippage that may occur between the receiving (upper) face of the saddle and the second (lower) surface of the glass as the glass is heated and cooled during the process of laminating the polymer plastic film the precast layer of glass.

The saddle or the ram, or both, may be heated and cooled so as to quickly transmit heat to and absorb heat from the combination of the glass and the polymer plastic film. Moreover, one of the saddle and the ram—usually the saddle—may be constantly heated, and the other—usually the ram—may be cooled sufficiently as to cause gross heat extraction away from the glass and polymer plastic combination. It has been found that it is preferable to heat the ram as the inflatable hard flexible contact member of the ram tends to provide good insulating properties. It has been found, however, that cooling of the ram by way of passing suitable oil through the hard flexible contact member does work acceptably well.

The discussion hereafter assumes the orientation of the apparatus and the glass to be as indicated above, without unduly restricting the disposition and modes and directions of operation of the apparatus.

The means to effect relative vertical motion of the ram and the saddle may comprise means to lower the rain towards the saddle, or it may comprise means to lift the saddle towards the ram. It is preferred for the saddle to be lifted towards the ram so as to avoid placing hydraulic fittings and fixtures or any sort above the saddle. Almost invariably hydraulic fittings and fixtures will tend to leak; and by not having any potential leak sources above the saddle, the possibility of hydraulic fluid dropping on to the saddle or on to product placed in the saddle is precluded.

The polymer plastic film may be a composite material of non-oriented and oriented polymer plastic film such as PVB/PET or polyurethane/PET, or it may be a single layer of non-oriented PVB or polyurethane—especially in the case when it is intended for a further layer of glass to be laminated to the structure.

In another aspect of the present invention, there is also provided a method of laminating a layer of polymer plastic film having opposed first and second surfaces to first surface of a precast layer of glass having opposed first and second surfaces, comprising the steps of:

(a) placing the precast layer of glass on a saddle such that the second surface of the precast layer of glass contacts a receiving face of the saddle, which receiving face is contoured to substantially the identical contour of the second surface of the precast layer of glass;

(b) disposing a polymer plastic film at a distance away from the first surface of the glass;

(c) introducing above the polymer plastic film, a ram having a hard flexible contact member with a contacting face adapted to contact a second surface of the plastic film, and also having an elastically compressible facing member operatively interposed between the hard flexible contact member and the ram;

(d) closing the distance between the contacting surface of the hard flexible contact member and the polymer plastic film, such that a portion of the contacting surface first contacts a portion of the first surface of the polymer plastic film and then continues to stretch and force the polymer plastic film into initial contact with the first surface of the precast layer of glass;

(e) increasing the pressure between the hard flexible contact member and the precast layer of glass so as to stretch and force the plastic film into increasingly greater contact area with the precast layer of glass;

(f) increasing the pressure between the hard flexible contact member and the precast layer of glass up to a predetermined level, and maintaining the pressure at that level;

(g) inflating the elastically compressible facing member so as to cause the contacting surface of the hard flexible contact member to substantially adapt to the contour of the first surface of the precast layer of glass;

(h) heating the combination of the precast layer of glass and the polymer plastic film to a predetermined temperature, and maintaining the combination of the precast layer of glass and the polymer plastic film at least at that temperature for at least a predetermined period of time;

(i) thereafter, cooling the combination of the precast layer of glass and the polymer plastic film to at least a predetermined temperature;

(j) thereafter, releasing the pressure of the ram against the by then laminated polymer plastic film and precast glass; and (k) thereafter, removing the laminated plastic and precast glass composite structure from the saddle.

In yet another aspect of the present invention, there is also provided a clamping mechanism for use in clamping a layer polymer plastic film in place in a laminating apparatus. The clamping mechanism comprises an upper collar member operatively mounted on the ram and a lower collar member operatively mounted on the saddle. The upper and lower collar members each have opposed co-operating faces shaped to form a seal between the upper and lower collar members upon mating of the opposed co-operating faces. There are a plurality of piercing pins securely mounted in either of the upper and lower collar members so as to each extend outwardly from a respective one of the opposed co-operating faces thereof towards a corresponding one of a plurality of receiving apertures disposed in the other of the opposed co-operating faces in the respective other one of the upper and lower collar members so as to be in register therewith. The receiving apertures are shaped and dimensioned so as to receive the corresponding one of the piercing pins therein upon mating of the upper and lower collar members. The piercing pins have sharp end portions which are adapted to pierce the polymer plastic film, whereby the polymer plastic film is retained in place when the upper and lower collar members are mated one to the other and the piercing pins are pierced through the polymer plastic film.

BRIEF DESCRIPTION OF THE DRAWINGS

The invention will be described in greater detail hereafter, having regard to the accompanying drawings, in which:

FIG. 7 is a notional side view similar to FIG. 1, with the elastically compressible facing member expanded by way of pressurization of the selectively expandable chamber.

DETAILED DESCRIPTION OF THE PREFERRED EMBODIMENTS

Figure 1:
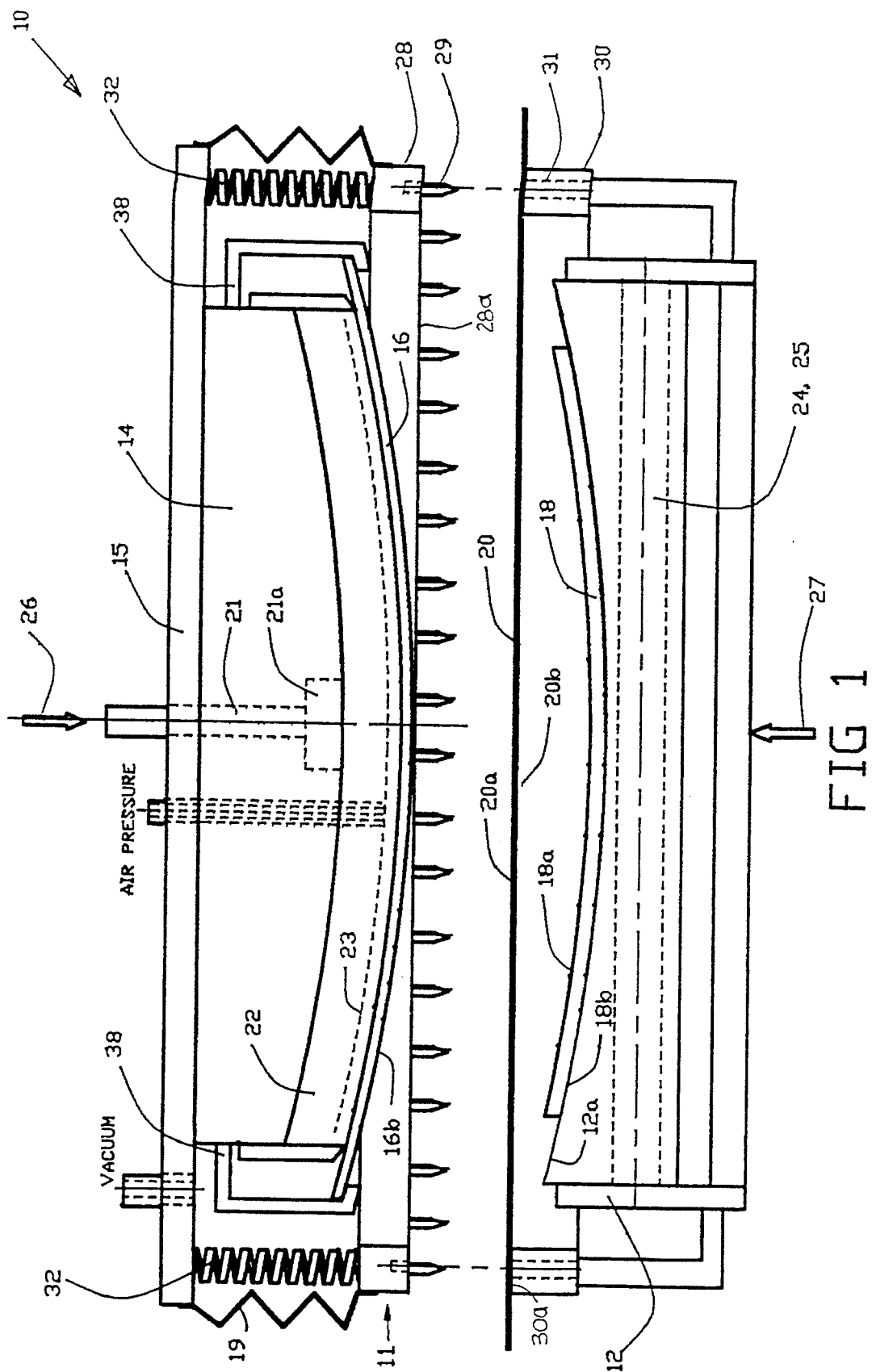
FIG. 1 is a notional side view of a preferred embodiment of the apparatus of the present invention showing the principal components of the invention, in an initial position with the ram raised above the plastic film.

As noted above, the present invention provides an apparatus and methods for laminating a layer of polymer plastic film having opposed first and second surfaces to a first surface of a precast layer of glass having opposed first and second surfaces.

Several general principles concerning the present invention, the operation of apparatus in keeping with the present invention, and the methods taught by the present invention, are now discussed:

In particular, the present invention is directed to laminating a polymer plastic film to glass (or glass to polymer plastic film) using pressure and heat so that the layer of film is of a uniform thickness. Particularly when the plastic film is such as PVB, polyurethane, PVB/PET, or polyurethane/PET, the working pressures and temperature of approximately 150° C., PVB will adhere to glass in a matter of up to 60 seconds under pressures of up to 1050 kPa. This permits sufficient time for the absorption of air at any interface with the PVB into the PVB. Once adhered, the plastic film remains adhered to the glass.

In general terms, the present invention contemplates that a precast layer of glass of any given contour is supported on a saddle having a receiving face substantially of the same contour as the lower surface of the precast layer of glass. As noted, that contour may be flat, simple curves, or it may have quite complex curvature. The saddle is lifted towards a ram (or the ram may be lowered towards the glass) so that the face of the ram contacts the polymer plastic film that has been interposed and positioned in place above the saddle and glass. The hard flexible contact member of the ram is generally more tightly curved than the first surface of the precast layer of glass.

Reference is now made to the accompanying Figures of drawings, namely FIGS. 1 through 7, where like components in the various figures are identified by identical reference numerals. The Figures show the laminating apparatus of the present invention generally designated by the reference numeral 10, and which comprises a support saddle 12 above which a ram 14 is located.

A precast of layer of glass 18 is placed on the saddle 12. Preferably, the receiving face 12a of the saddle 12 is substantially identical in contour to the second (lower) surface 18b of the precast layer of glass 18. The support saddle 12 is thereby shaped and dimensioned to support the second (lower) surface 18b of the glass 18 and thereby support the preformed layer of glass 18.

At least one of the saddle 12 and the ram 14 is adapted to transmit heat to and remove heat from the precast layer of glass 18 and the polymer plastic film 20 being laminated thereto when the glass 18 is placed on the saddle 12. In the preferred embodiment, there are located within the saddle 12 heating and cooling elements and ducts generally indicated at 24. These heating and cooling elements and ducts may also or alternatively be located in the ram 14, if desired. The heating may be gained from electric heating elements, and the cooling may be realized by circulating any suitable cooling liquid. In any event, the receiving face 12a of the saddle 12, which is in contact with the precast layer of glass 18, must have high heat transfer characteristics. Materials such as stainless steel, titanium, ceramic, and other similar metals capable of withstanding temperature cycling and pressures should be used.

It is a feature of the present invention that at least the receiving face 12a and the proximal region of the saddle 12 near the upper surface which is in contact with the glass 18, has essentially the same coefficient of heat expansion and contraction as that of the glass. Thus, as the saddle 12 is heated or cooled in order to heat or cool the glass 18, its surface expands or contracts linearly—that is, sideways—at essentially the same rate as the glass. Of course, it is possible that in some circumstances the receiving face 12a of the saddle 12 may be coated with a polymeric low friction coating so that a very small or limited amount of slippage of the glass with respect to the saddle may be permitted. That polymeric low friction coating may conveniently be a silicone compound or PTFE.

Generally, at least the receiving face 12a, or at least a portion of the saddle 12 is made from stainless steel. It is particularly convenient to use stainless steel compound SS430, because that alloy has a coefficient of heat expansion and contraction which is quite similar to that of glass. Alternatively, the lower portion of the saddle 12, including that portion of the saddle where the heating and cooling elements 24 are located, may be made from aluminum or other high heat conductivity metal, which has a higher thermal conductivity than stainless steel, thereby assuring fast and efficient heat transfer to the glass and fast and efficient heat transfer away from the glass (cooling). Similar heat transfer structure and characteristics may be employed in the support structure for the ram 14, as necessary and required.

A layer of polymer plastic film 20 is positioned in a first orientation, generally parallel to the first (upper) surface 18a of the precast layer of glass 18, as defined by the initial positioning of the polymer plastic film 20 in a clamping mechanism, as indicated by the general reference numeral 11. The clamping mechanism 11 comprises upper and lower collar members 28, 30. The upper collar member 28 is operatively mounted so as to be peripherally disposed around the bottom area of the ram 14 and is operatively mounted by way of a plurality of spring members 32. The lower clamping means 28 is operatively mounted so as to be peripherally disposed around the top area of the saddle 12.

The upper and lower collar members 28, 30 each have opposed co-operating faces 28a, 30a. These opposed co-operating faces 28a, 30a are generally of a flat and smooth shape so as to form a seal between the upper and lower collar members 28, 30 upon mating of the opposed co-operating faces 28a, 30a. A plurality of piercing pins 29 are securely mounted within the upper collar member 28 so as to extend outwardly therefrom. Each of the piercing pins 29 extends towards a co-operating receiving aperture 31 disposed in the co-operating face 30a of the lower collar member 30, so as to be in register therewith. The piercing pins 29 are preferably cylindrical in shape for the purposes of ease of manufacture and ease of installation. The receiving apertures 31 are shaped and dimensioned so as to properly receive the piercing pins 29 therein upon mating of the upper and lower collar members 28, 30. The piercing pins 29 have sharp end portions which are adapted to pierce the layer of polymer plastic film 20 as the upper and lower collar members 28, 30 are brought together. The polymer plastic film 20 is retained in place at a suitable distance away from the first (upper) surface 18a of the surface of the precast layer of glass. When the upper and lower collar members 28, 30 are mated one to the other, the piercing pins 29 have pierced through the polymer plastic film 20 so as to retain the layer of polymer plastic film 20 in place during the laminating operation at a suitable distance away from the first (upper) surface 18a of the surface of the precast layer of glass, before the layer of polymer plastic film 20 is introduced to the precast layer of glass.

Alternatively, the piercing pins 29 can be disposed in the lower collar member 30 and the receiving apertures 31 can be disposed in the upper collar member 28. Further, the piercing pins 29 and the receiving apertures 31 may be disposed alternatingly on both the upper and lower collar members 28, 30.

It is important that the upper and lower collar members 28, 30 are of a shape and size so as to retain the layer of polymer plastic film 20 during the laminating operation such that the polymer plastic film 20 is stretched evenly—that is to say, to an even thickness—over the precast layer of glass 18. In order to accomplish this, the shape and size of the upper and lower collar members 28, 30 must be precalculated such that the clearance between the upper and lower collar members 28, 30 and the precast layer of glass 18 permits the required even stretching of the layer of polymer plastic film 20 retained therewithin.

The ram 14 is disposed above the saddle 12 so as to be in vertical register therewith. The ram 14 is used to press the layer of polymer plastic film 20 onto the first (upper) surface 18a of the precast layer of glass 18.

The ram 14 and the saddle 12 are moveable with respect to one another in a direction that is generally perpendicular to the first orientation of the polymer plastic film 20, between a first relative position or at the ram 14 is position is spaced apart relation with respect to the first surface of the polymer plastic film 20, and a second relative or at the polymer plastic film 20 is being fully pressed against the first surface 18a of the precast layer of glass 18. In the preferred embodiment, the saddle 12 is moveable and the ram 14 is stationary so as to accommodate the various pneumatic lines (not shown).

In FIG. 1, arrows 26 and 27 are shown to indicate the closing pressure between the ram 14 and the saddle 12. It is understood that either the ram 14 may be lowered, or the saddle 12 may be raised (as discussed above) and that in either event the closing pressure between the ram 14 and saddle 12 is created as indicated by the arrows 26 and 27.

Located at the bottom of the ram 14 is a hard flexible contact member 16 that is substantially unstretchable and in the preferred embodiment is made from glass. The hard flexible contact member 16 secured in place on the ram by way of a pair of clamps 38, one on each side of the ram 14. The main purpose of the hard flexible contact member to act as a pressure distributor to ensure even pressure of the ram 14 against the plastic film 20 and the precast layer of glass 18. The hard flexible contact member 16 is deformable in a manner to be detailed subsequently.

An elastically compressible facing member 22 is interposed between the hard flexible contact member 16 and the ram 14. The elastically compressible facing member 22 is in the form of a solid body of deformable material having a top surface, a generally parallel bottom surface, and at least one edge surface connecting the top and bottom surfaces. In the preferred embodiment, the elastically compressing facing member 22 is essentially a rectangular prism and the preferred material is an elastomeric material having a hardness of about durometer 40, either a rubber material made substantially from pure rubber material or from a silicone rubber material. The elastically compressible facing member 22 additionally provides a cushioned backing for the hard flexible contact member 16, which cushioned backing also allows for slight angular deviation between the ram 14 and the saddle 12 to be accommodated. Further, the elastically compressible facing member 22 provides means for flexing the hard flexible contact member 16 slightly so as to essentially match the contour of each precast layer of glass 18, which also will be detailed subsequently.

The lower surface of the hard flexible contact member 16 is a contacting surface 16b that is adapted to intimately contact the first (upper) surface 20a of the layer of polymer plastic film 20, and to evenly press the layer of polymer plastic film 20 onto the precast layer of glass 18. The hard flexible contact member 16 is preferably a thin layer of glass generally shaped, at least at its contacting surface 16b, to match as closely as possible the general contour of the first (upper) surface 20a of the precast layer of glass 18. Since each replication of the precast layer of glass 18 is of a slightly different contour than the all of the other replications, the hard flexible contact member 16 cannot possibly match the contour of each one precisely. For this reason, the hard flexible contact member 16 is flexible in order to be able to match the contour of the first (upper) surface of each precast layer of glass 18. Further, the material of the hard flexible contact member must have a heat resistance that it will not otherwise deform except by pressure at least up to temperature somewhat above the working temperature at which the non-oriented plastic film—PVB or polyurethane—is adhered to the glass. Generally, that means that this material must have heat resistance as described above up to at least about 160° C.

The hard flexible contact member 16 is flexible for three reasons. Firstly, it is desirable to initially curve the hard flexible contact member 16 to a more convex shape than the first (upper) surface 18a of the precast layer of glass 18. This increased convex curvature is accomplished by way of an extendable piston 21 mounted securely on the ram 14, which extendible piston 21 is extended slightly at the beginning of the laminating operation. The extendable piston 21 is vertically oriented such that the head 21a thereof engages the elastically compressible facing member 22 so as to selectively move the central portion of the elastically compressible facing member 22 downwardly in order to cause the contacting surface 16b to acquire an even more convexly curved shape than the first (upper) surface 18a of the precast layer of glass 18. Such increased convex curvature allows for the contacting surface 16b of the hard flexible contact member 16 to initially contact the central area of the polymer plastic film 20 and the precast layer of glass 18 so that the polymer plastic film 20 may be applied to the glass 18 from the central area and then contact a progressively radially increasing surface area until the entire first surface of the glass 18 is covered.

Secondly, it is desirable for the contacting surface 16b of the hard flexible contact member 16 to be formed as closely as possible to the first (upper) surface of the precast layer of glass 18 so that the polymer plastic film 20 is applied in a uniform thickness over the entire first surface of the layer of glass 18. Since each separate replication of the precast layer of glass is contoured slightly differently, it is necessary to have a flexible contacting surface on the ram 14 in order to be able to match each contour. In order to cause the contacting surface 16b of the hard flexible contact member 16 to be flexed so as to essentially match the contour of each precast layer of glass, the elastically compressible facing member 22 has a selectively expandable chamber 23 therein in the form of a generally horizontally disposed slit. The selectively expandable chamber 23 extends across most of the length and width of the elastically compressible facing member 22 except for the perimeter thereof, whereat the elastically compressible facing member 22 is sealed so as to allow the selectively expandable chamber 23 to be pressurizable through introduction of a gas, such as air, into the selectively expandable chamber 23. The selectively expandable chamber 23 is inflatable to a pressure that is substantially greater than the laminating pressure required for laminating the layer of polymer plastic film 20 to the precast layer of glass 18.

Thirdly, it is necessary that the material used have as smooth a contacting surface as the resulting laminated vehicle windshield must have, so that the first surface 20a of the polymer plastic film, which is shaped by the contacting surface 16b of the hard flexible contact member 16, will have a smooth surface so as to be optically clear.

The selectively expandable chamber 23 is pressurized by way of a selectively actuatable pressurization means in fluid communication therewith. The selectively actuatable pressurization means is typically merely a source of pressurized air, from either an air tank or air compressor, at a pressure of perhaps about 350 kPa to about 700 kPa. A standard valve is used to regulate the flow of the compressed air into the selectively expandable chamber 23.

In order to be properly deformable, as required, the hard flexible contact member is preferably made of either pure rubber or silicon rubber and is about 2 to 3 cm thick. Another purpose of the silicone rubber as used in the hard flexible contact member, and also of the basic hollow construction of the hard flexible contact member itself, is, therefore, to act as an insulator so that when the heating and cooling elements 24 and/or 25 are activated, there is no significant loss of heat and therefore of energy.

Figure 2:
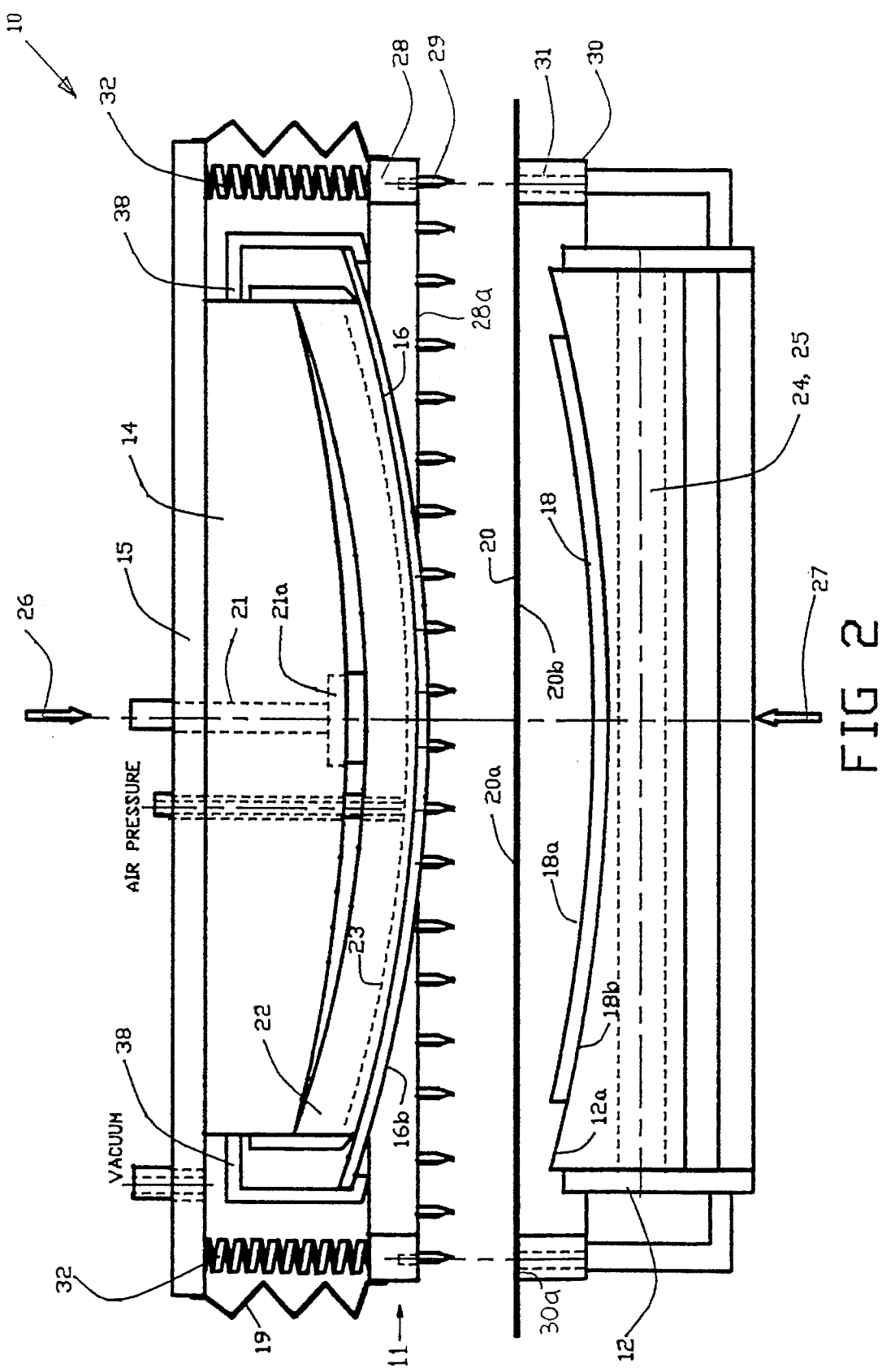
FIG. 2 is a notional side view similar to FIG. 1, with the piston in the ram extended.
Figure 3:
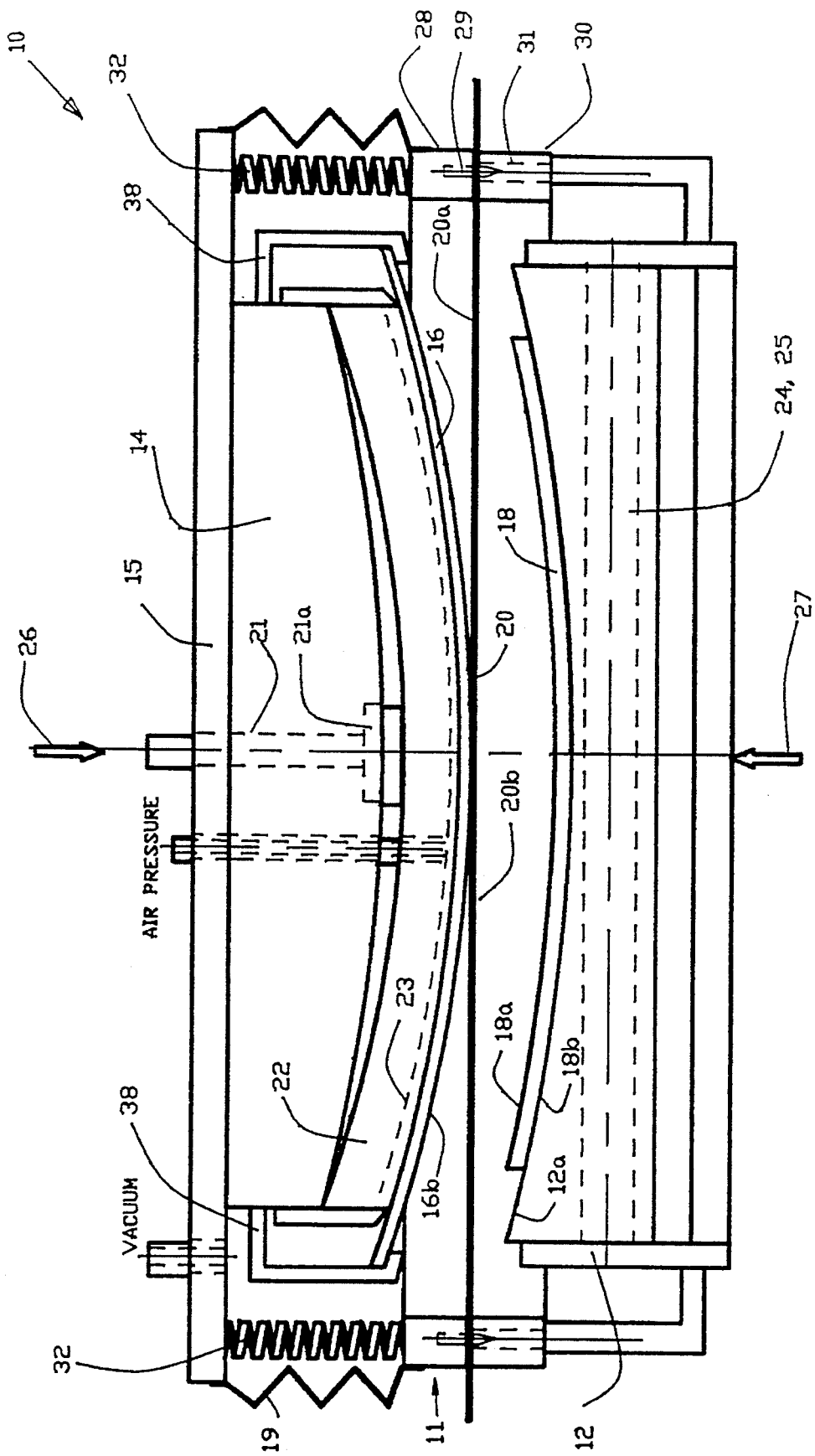
FIG. 3 is a notional side view of the preferred embodiment of FIG. 1, with the ram having just contacted the plastic film, while the clamping device holds the film firmly in place.
Figure 4:
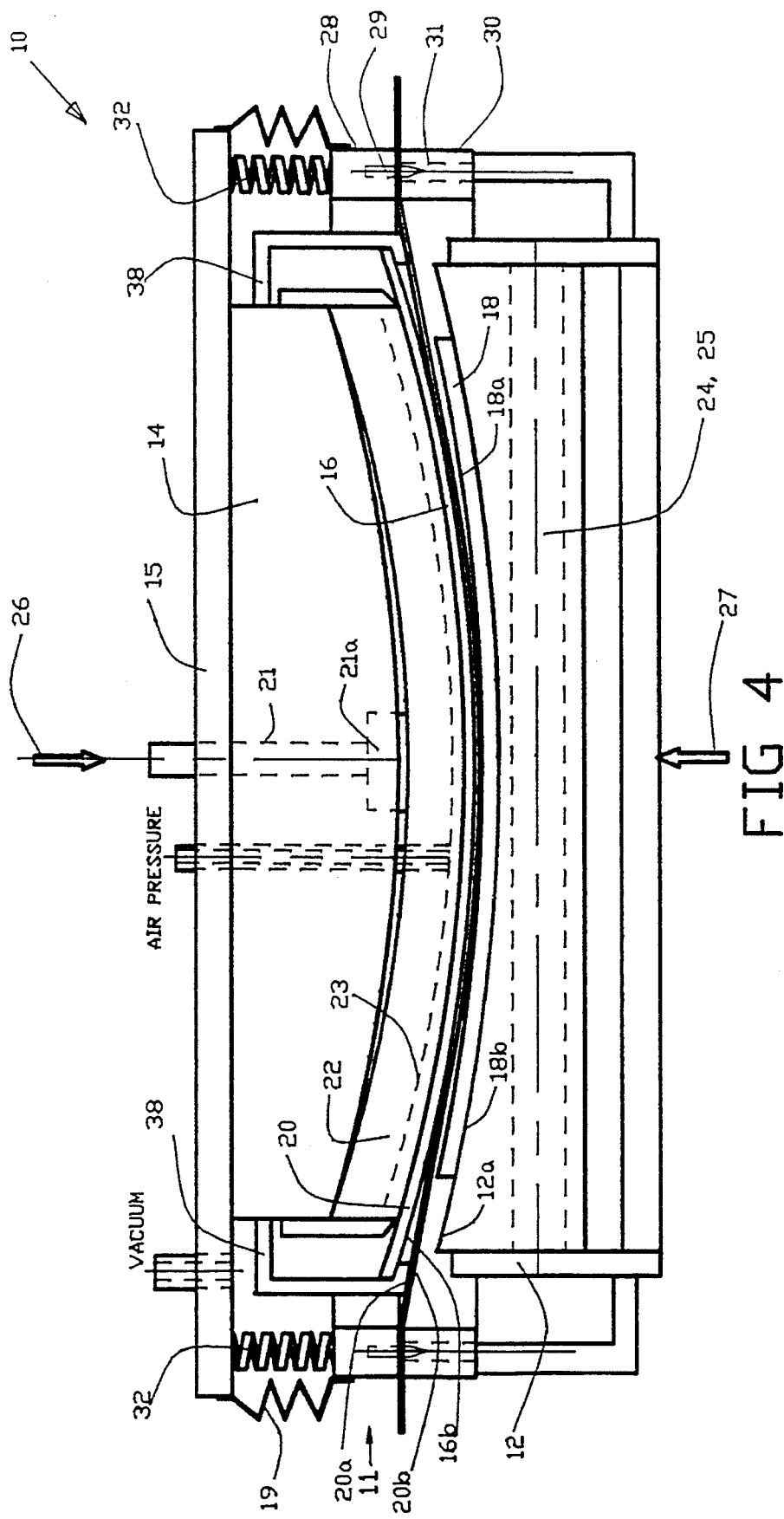
FIG. 4 is a notional side view similar to FIG. 1, with the ram having pushed the plastic film into contact with the central portion of the upper surface of the precast layer of glass.

In operation, the ram 14 is positioned in its first relative position with respect to the saddle 12 at a distance away from the first (upper) surface of the layer of polymer plastic film 20, as is shown in FIG. 1. By this positioning, the first (upper) surface 20a of the plastic film 20 faces the contacting surface 16a of the hard flexible contact member 16, and the second (lower) surface 20b of the plastic film 20 faces the first (upper) surface 18a of the precast layer of glass 18. The extendible piston 21 is then extended slightly so as to increase the convex curvature of the hard flexible contact member 16, as is shown in FIG. 2. The extendible piston 21 continues to extend so that a generally central portion of the contacting surface 16 first contacts a generally central portion of the first surface 20a of the polymer plastic film 20, as is shown in FIG. 3, and then continues to stretch and force the polymer plastic film 20 into initial contact with a generally central portion of the first surface 18a of the precast layer of glass 18, as is shown in FIG. 4.

The present invention also provides means for assisting with the removal of air from between the layer of polymer plastic film 20 and the precast layer of glass 18, if necessary. An accordion shaped rubber shield 19 is attached in sealed relation to both the base portion 15 of the ram 14 and to the upper clamping means 28. When the upper clamping means 28 is brought into contact with the lower clamping means 30, as best seen in FIG. 3, the space between the ram 14 and the saddle 12 is substantially sealed off to the ambient surroundings. A vacuum pump 17 is then used to exhaust the air contained within this space such that there is virtually no air remaining therein to become trapped between the layer of polymer plastic film 20 and the precast layer of glass 18.

The ram 14 and the saddle 12 are moveable with respect to one another in a direction that is generally perpendicular to the first orientation of the polymer plastic film 20, between a first relative position or at the ram 14 is position is spaced apart relation with respect to the first surface of the polymer plastic film 20, and a second relative or at the polymer plastic film 20 is being fully pressed against the first surface 18a of the precast layer of glass 18. In the preferred embodiment, the saddle 12 is moveable and the ram 14 is stationary so as to accommodate the various pneumatic lines (not shown) used to feed pressurized air to the selectively expandable chamber 23 and the extendable piston 21. The means for affecting the relative movement between the ram 14 and the saddle 12 is typically a conventional hydraulic piston arrangement, as is well known in the industry.

Figure 5:
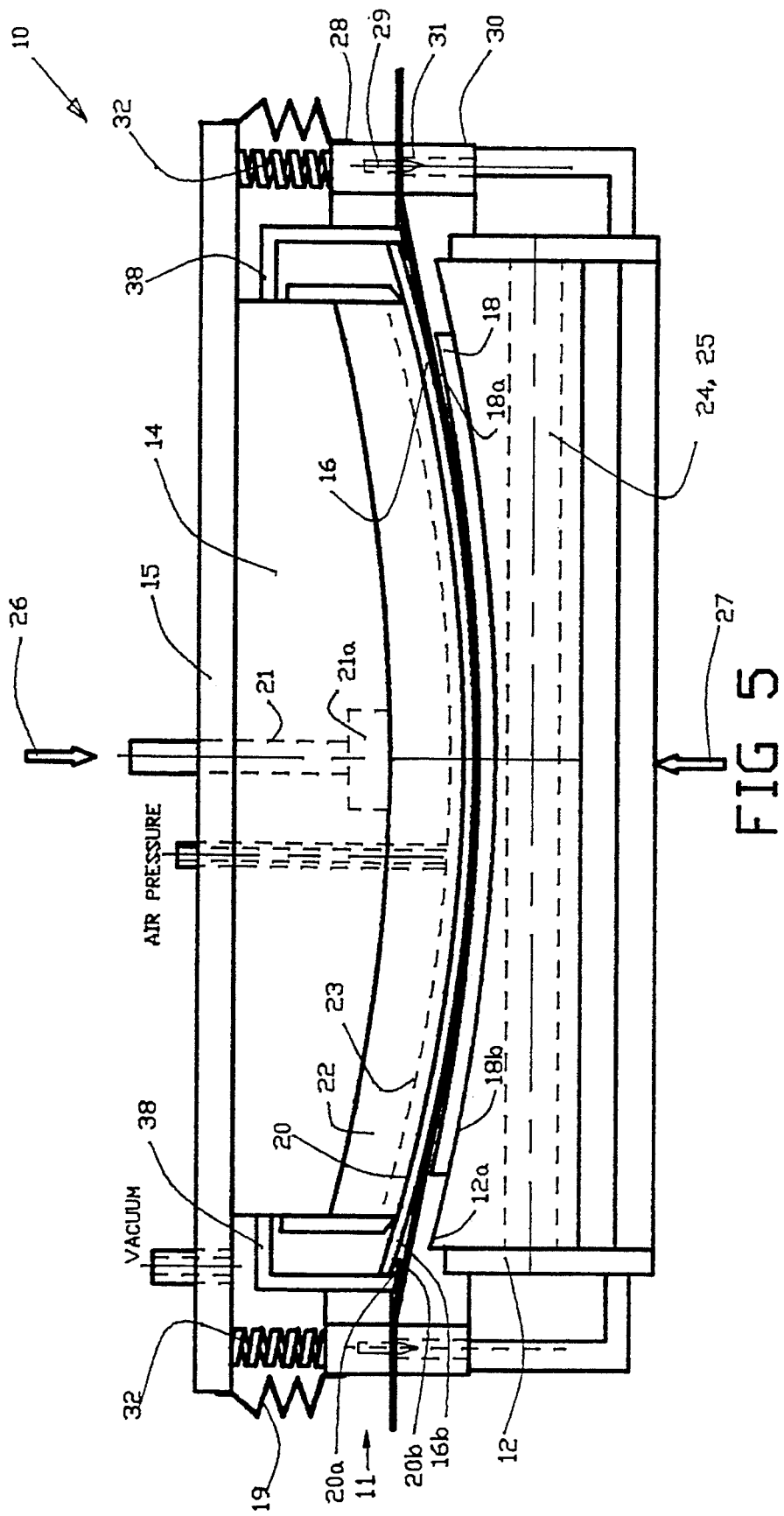
FIG. 5 is a notional side view similar to FIG. 1, with the ram having now pushed a much greater amount of the plastic film into contact with most of the upper surface of the precast layer of glass.
Figure 6:
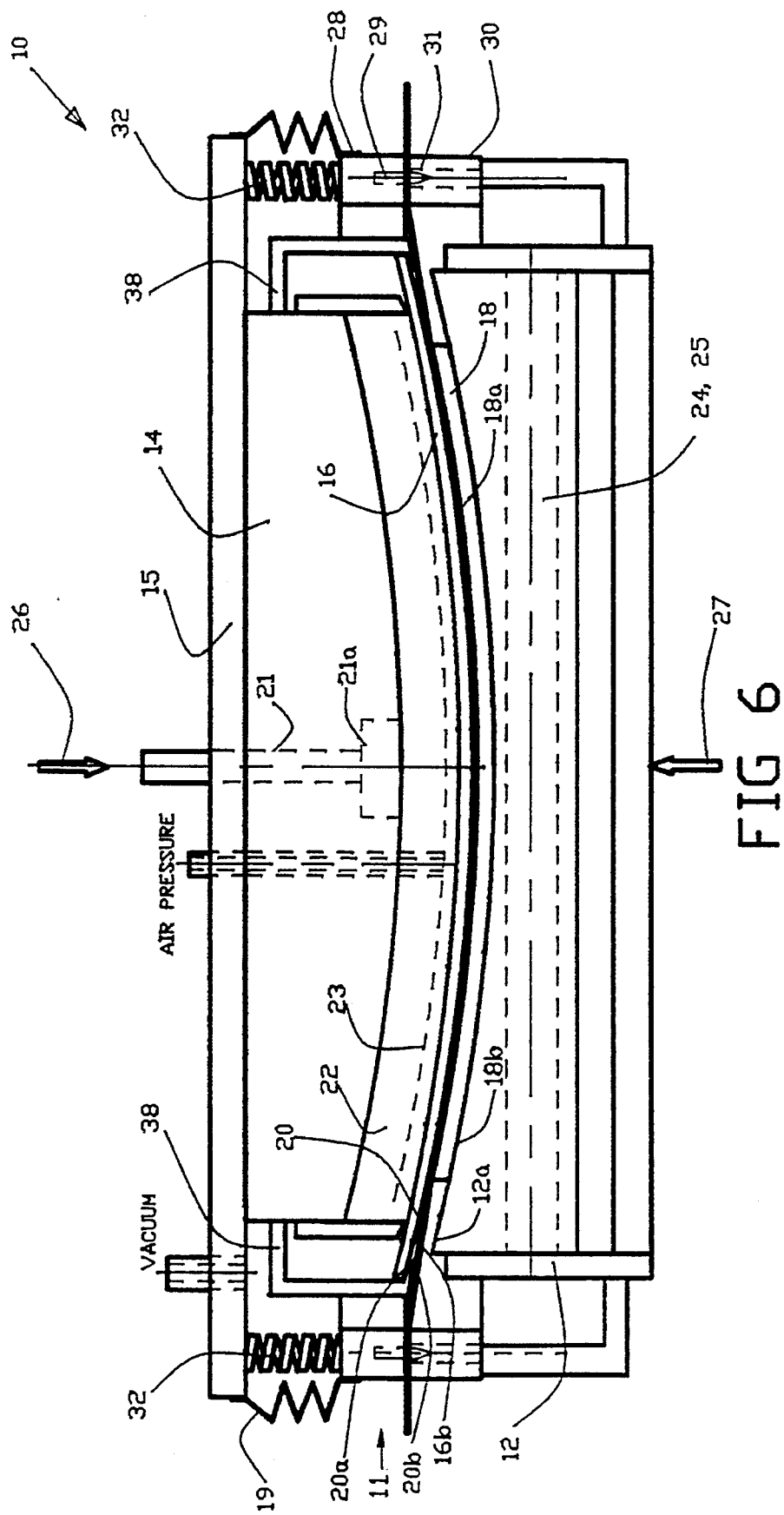
FIG. 6 is a notional side view similar to FIG. 1, with the ram having pushed the plastic film into complete contact with the upper surface of the precast layer of glass.

Effecting relative movement between the ram 14 and the saddle 12 so as to close the distance between the hard flexible contact member 16 and the polymer plastic film 20, ultimately causes the contacting surface 16b of the hard flexible contact member 16, the polymer plastic film 20, the precast layer of glass 18, and the receiving surface 12a of the saddle 12, to be in intimate physical contact seriatim. The extendible piston 21 is automatically retracted by the force of the contact between the hard flexible contact member 16 and the precast layer of glass 18. As the distance between the ram 14 and the saddle 12 continues to close, the polymer plastic film 20 contacts a progressively radially increasing surface area of the first (upper) surface 18a of the precast layer of glass 18, as is shown in FIG. 5, until the plastic film 20 has been applied to the entire first surface of the precast layer of glass 18, as is shown in FIG. 6.

After the layer of polymer plastic film 20 has been initially applied to the entire first (upper) surface 18a of the 18, the hard flexible contact member 16 is deformed slightly so as to generally match the contour of the first (upper) surface 18a of the precast layer of glass 18 by way of pressurization of the selectively expandable chamber 23, as is shown in FIG. 7. In this manner the hard flexible contact member in essence conforms to the minor irregularities of the upper surface of the glass 18. Correspondingly, the layer of polymer plastic film 20 is applied evenly to the precast layer of glass 18. When PVB is used as the laminating film, it will generally laminate under the pressure of about 275 kPa to about 1050 kPa at temperatures of 120° C. to 140° C. The selectively expandable chamber 23 may be pressurized to an equilibrium point whereat the vertically directed (both upwardly and downwardly) forces from the elastically compressible facing member 22 is equal to the closing force of the ram 14 and the saddle 12 against each other. The upwardly and downwardly vertically directed forces are a product of the gas pressure and the projected surface area perpendicular to that direction. Pressurization of the selectively expandable chamber 23 beyond this equilibrium point could cause the ram 14 and the saddle 12 to separate slightly. In the preferred embodiment, the ram 14 and the saddle 12 are clamped together by a clamping means of any suitable type (not shown), so that the selectively expandable chamber 23 may be pressurized beyond the equilibrium point without the ram 14 and the saddle 12 separating, and even to a pressure that is substantially greater than the laminating pressure required for laminating the layer of polymer plastic film 20 to the precast layer of glass 18.

The steps of the present invention have been discussed above. Thus, having regard to the recital of the steps noted above, step (a) calls for the precast glass 18 to be placed on the saddle 12 such that the second (lower) face of the precast layer of glass contacts the receiving surface of the support saddle 12. Step (b) requires that the polymer plastic film 20 be clamped over the saddle. Step (c) introduces a hard flexible contact member above the polymer plastic film, with the hard flexible contact member having a first surface adapted to contact a second surface of the plastic film. A co-operating base portion is adapted to be in sealed relation with the hard flexible contact member so as to form a gas containing chamber therebetween. The gas containing chamber is at least partially inflated so as to cause the first surface of the hard flexible contact member to be more convexly contoured than the first surface of the precast layer of glass. The pressure within the gas containing chamber may be increased so as to inflate the gas containing chamber to a pressure suitable for pressing the polymer plastic film. Step (d) calls for the distance between the hard flexible contact member and the saddle 12 to be closed, so that the contacting surface 16b of the hard flexible contact member 16 first contacts a portion of the polymer plastic film 20 and then stretches the film 20 and forces it into contact with the first (upper) surface of the precast layer of glass 18.

Thereafter, as recited, steps (e) and (f) provide for the pressure between the hard flexible contact member 16 of the ram 14 and the precast layer of glass 18 and the plastic film 20 to be increased so as to stretch and force the plastic film 20 into increasingly greater contact area with the precast layer of glass 18. The pressure may be increased in either or both of two ways. Firstly, the gas pressure within the gas containing chamber may be increased. Secondly, the distance between the base portion of the ram and the saddle may be further closed. In any event, the pressure between the hard flexible contact member 16 and the precast layer of glass 18 is increased up to a predetermined level, and then maintained at that level. While the pressure is being maintained at the predetermined level, step (g) provides that the saddle is heated to a predetermined temperature, and maintained at that temperature for a predetermined period of time.

Thereafter, step (h) is followed to cool the saddle to a predetermined temperature, and then step (i) provides that the pressure of the ram against the plastic film 20—which is by then laminated to the precast glass 18—be released. Finally, step (h) provides for the laminated plastic and precast glass composite structure to be removed from the saddle 12.

Other modifications and alterations may be used in the design and manufacture of the present invention without departing from the spirit and scope of the accompanying claims.

What is claimed is:

1. An apparatus for laminating a layer of polymer plastic film having opposed first and second surfaces to a first surface of a precast layer of glass having opposed first and second surfaces, comprising:

a support saddle having a receiving face that is shaped and dimensioned to support said second surface of said glass;

holding means for positioning said layer of polymer plastic film in a first orientation in spaced apart relation with respect to said precast layer of glass when said layer of glass is supported by said saddle such that said second surface of the layer of polymer plastic film faces said first surface of the precast layer of glass;

a ram including a hard flexible contact member having a contacting surface adapted to intimately contact said first surface of said plastic film, and an elastically compressible facing member in intimate contact with a surface opposite to the contacting surface of said hard flexible contact member, said elastically compressible facing member having a selectively expandable chamber therein;

said ram and said saddle being movable with respect to each other between a first relative position whereat said ram is positioned in spaced apart relation with respect to said first surface of said layer of polymer plastic film and a second relative position whereat said polymer plastic film is being fully pressed against the first surface of said precast layer of glass;

heating means configured to provide heat to said precast layer of glass and said polymer plastic film being laminated thereto when said glass is placed on said saddle;

means for effecting relative movement of said ram and said saddle between said first and second relative positions, in a direction that is generally perpendicular to said first orientation so as to close the distance between said ram and said polymer plastic film sufficiently so as to cause said contacting surface of said hard flexible contact member, said polymer plastic film, said glass, and said receiving face of said saddle to be in intimate physical contact seriatim, whereby said polymer plastic film contacts a progressively radially increasing surface area of said first surface of said glass and is thereby laminated to said precast layer of glass; and selectively actuatable pressurization means in fluid communication with said selectively expandable chamber so as to permit the pressurization of said selectively expandable chamber;

whereby said contacting surface of said hard flexible contact member is caused to match the contour of said first surface of said precast layer of glass by way of pressurization of said selectively expandable chamber.

2. The apparatus of claim 1, wherein said elastically compressible facing member is in the form of a solid body of a deformable material having a top surface, a generally parallel bottom surface, and at least one edge surface connecting said top and bottom surfaces.

3. The apparatus of claim 2, wherein said deformable material is an elastomeric material.

4. The apparatus of claim 3, wherein said elastomeric material is a rubber material.

5. The apparatus of claim 4, wherein said rubber material is made substantially from pure rubber material.

6. The apparatus of claim 4, wherein said rubber material is made substantially from a silicone rubber material.

7. The apparatus of claim 3, wherein said deformable material has a hardness of about durometer 40.

8. The apparatus of claim 2, wherein said selectively expandable chamber is in the form of a generally horizontally disposed slit.

9. The apparatus of claim 2, wherein said top surface and said bottom surface are substantially parallel to one another.

10. The apparatus of claim 9, wherein said elastically compressible facing member has the shape of a rectangular prism.

11. The apparatus of claim 1, further comprising clamping means adapted to selectively clamp said ram and said saddle in said second relative position.

12. The apparatus of claim 11, wherein said selectively expandable chamber is pressurizable to a pressure that is substantially greater than the laminating pressure required for laminating said layer of polymer plastic film to said precast layer of glass.

13. The apparatus of claim 1, wherein said hard flexible contact member is substantially unstretchable.

14. The apparatus of claim 13, wherein said hard flexible contact member is made from glass.

15. The apparatus of claim 1, further comprising an extendable piston having a head member attached to said elastically compressible facing member, wherein extending said head member causes said hard flexible contact member to initially curve said hard flexible contact member to a more convex shape than the first layer of said precast layer of glass.

16. The apparatus of claim 1, wherein at least one of said saddle and said ram is adapted to transmit heat to said precast layer of glass and said polymer plastic film being laminated thereto when said glass is placed on said saddle.

17. The apparatus of claim 1, wherein at least one of said saddle and said ram is adapted to remove heat from said precast layer of glass and said polymer plastic film being laminated thereto when said glass is placed on said saddle.

18. A method of laminating a layer of polymer plastic film having opposed first and second surfaces to first surface of a precast layer of glass having opposed first and second surfaces, comprising the steps of:

(a) placing said precast layer of glass on a saddle such that said second surface of said precast layer of glass contacts a receiving face of said saddle, which receiving face is contoured to substantially the identical contour of said second surface of said precast layer of glass;

(b) disposing a polymer plastic film at a distance away from said first surface of said glass;

(c) introducing above said polymer plastic film, a ram having a hard flexible contact member with a contacting face adapted to contact a second surface of said plastic film, and also having an elastically compressible facing member operatively interposed between said hard flexible contact member and said ram;

(d) closing the distance between the contacting surface of said hard flexible contact member and said polymer plastic film, such that a portion of said contacting surface first contacts a portion of said first surface of said polymer plastic film and then continues to stretch and force said polymer plastic film into initial contact with said first surface of said precast layer of glass;

(e) increasing the pressure between said hard flexible contact member and said precast layer of glass so as to stretch and force the plastic film into increasingly greater contact area with said precast layer of glass;

(f) increasing the pressure between said hard flexible contact member and said precast layer of glass up to a predetermined level, and maintaining the pressure at that level;

(g) inflating said elastically compressible facing member so as to cause the contacting surface of said hard flexible contact member to substantially adapt to the contour of the first surface of said precast layer of glass;

(h) heating said combination of the precast layer of glass and the polymer plastic film to a predetermined temperature, and maintaining said combination of the precast layer of glass and the polymer plastic film at least at that temperature for at least a predetermined period of time;

(i) thereafter, cooling said combination of the precast layer of glass and the polymer plastic film to at least a predetermined temperature;

(j) thereafter, releasing the pressure of said ram against the by then laminated polymer plastic film and precast glass; and (k) thereafter, removing the laminated plastic and precast glass composite structure from said saddle.

19. The method of claim 18, where before step (d), an additional step of pre-curving said hard flexible contact member is taken , such that said contacting face is more convexly curved than the first surface of the precast layer of glass.

20. The method of claim 19, wherein the step of precurving said hard flexible contact member is performed through the use of an extendable piston having a head member attached to said elastically compressible facing member, with the head member of said extendible piston being extended so as to cause said hard flexible contact member to pre-curve as aforesaid.

* * * * *